United States Patent
Huang et al.

(10) Patent No.: US 9,614,834 B2
(45) Date of Patent: Apr. 4, 2017

(54) PERMISSION MANAGEMENT METHOD, APPARATUS, AND TERMINAL

(71) Applicant: Huawei Device Co., Ltd., Shenzhen (CN)

(72) Inventors: Xi Huang, Shenzhen (CN); Huangwei Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 70 days.

(21) Appl. No.: 14/586,218

(22) Filed: Dec. 30, 2014

(65) Prior Publication Data
US 2015/0121478 A1    Apr. 30, 2015

Related U.S. Application Data

(63) Continuation of application No. PCT/CN2013/082182, filed on Aug. 23, 2013.

(51) Int. Cl.
*H04L 29/06* (2006.01)
*G06F 21/51* (2013.01)
(Continued)

(52) U.S. Cl.
CPC .......... *H04L 63/0823* (2013.01); *G06F 21/51* (2013.01); *G06F 21/604* (2013.01); *G06F 21/6281* (2013.01)

(58) Field of Classification Search
CPC ............. H04L 63/0823; G06F 21/6281; G06F 21/604; G06F 21/51
(Continued)

(56) References Cited

U.S. PATENT DOCUMENTS 6,112,305 A * 8/2000 Dancs ................ H04L 9/3268
380/255
6,591,095 B1 * 7/2003 Palaniswamy ...... H04L 63/0823
455/410
(Continued)

FOREIGN PATENT DOCUMENTS

CN    1816192 A    8/2006
CN    101655892 A    2/2010
(Continued)

OTHER PUBLICATIONS

Foreign Communication From a Counterpart Application, Chinese Application No. 201380002717.3, Chinese Office Action dated Oct. 9, 2015, 11 pages.
(Continued)

*Primary Examiner* — Matthew Henning
(74) *Attorney, Agent, or Firm* — Conley Rose, P.C.

(57) ABSTRACT

A permission management method, apparatus, and terminal. The permission management method includes obtaining an installation package of a first application program, where the installation package carries a first certificate and permission request information of the first application program; next, determining, according to the permission request information, a first permission that the first application program requires during running, where the first permission is a system administrator permission of a system; and then, granting the first permission to the first application program according to the first certificate of the first application program. In this way, the first permission that the first application program requires during running is granted to the first application program.

16 Claims, 8 Drawing Sheets

(51) Int. Cl.
*G06F 21/60* (2013.01)
*G06F 21/62* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 6,671,803 | B1* | 12/2003 | Pasieka | G06F 21/606 380/201 |
| 2003/0066091 | A1* | 4/2003 | Lord | H04N 7/17318 725/135 |
| 2006/0031941 | A1* | 2/2006 | Xiao | G06F 21/51 726/27 |
| 2006/0200668 | A1 | 9/2006 | Hybre et al. | |
| 2009/0210702 | A1* | 8/2009 | Welingkar | H04L 9/321 713/156 |
| 2009/0254993 | A1* | 10/2009 | Leone | G06F 21/51 726/25 |
| 2013/0074197 | A1 | 3/2013 | Shelton et al. | |
| 2014/0018041 | A1 | 1/2014 | Summerer | |
| 2014/0215206 | A1* | 7/2014 | Courtney | H04L 9/3268 713/156 |

FOREIGN PATENT DOCUMENTS

| | | |
|---|---|---|
| CN | 101854624 A | 10/2010 |
| CN | 101854627 A | 10/2010 |
| CN | 102625309 A | 8/2012 |
| CN | 102804193 A | 11/2012 |
| CN | 102833070 A | 12/2012 |
| CN | 103065098 A | 4/2013 |
| DE | 102011015710 A1 | 10/2012 |
| WO | 2012130460 A1 | 10/2012 |

OTHER PUBLICATIONS

Shackman, M., "Platform Security—A Technical Overview," Symbian, Version 1.2, Retrieved from the Internet: URL: https://web.archive.org/web/20081012104449/http://developer.symbian.com/main/downlaods/papers/plat_sec_tech_overview/platform_security_a_technical_overview.pdf [retrieved on Mar. 4, 2016], Oct. 12, 2008, 12 pages.

Harker, A., "Symbian OS Platform Security/08. Native Software Installer," Retrieved from the Internet:URL:https://web.archive.org/web/20111031110549/http://wiki.franklinheath.co.uk/index.php/Symbian_OS_Platform_Security/08._Native_Software_installer= Symbian OS Platform Security_08.pdf [retrieved on Mar. 4, 2013], Oct. 31, 2011, 19 pages.

Heath, C., "Symbian OS Platform Security/01. Why a Secure Platform?," Retrieved from the Internet:URL:https://web.archive.org/web/20110127115901/http://wiki.franklinheath.co.uk/index.php/Symbian_OS_Platform_Security/01._Why_a_Secure_Platform%3F= Symbian OS Platform Security_01.pdf [retrieved on Mar. 4, 2016], Jan. 27, 2011, 9 pages.

Preston, G., et al., "Symbian OS Platform Security/09. Enabling Platform Security," Retrieved from the Internet: URL:https://web.archive.org/web/20110127115906/http://wiki.franklinheath.co.uk/index.php/Symbian_OS_Platform_Security/09._Enabling_Platform_Security=Symbian OS Platform Security_09.pdf [retrieved on Mar. 4, 2016], Jan. 27, 2011, 14 pages.

Foreign Communication From a Counterpart Application, European Application No. 13886160.4, Extended European Search Report dated Mar. 11, 2016, 7 pages.

Foreign Communication Form a Counterpart Application, European Application No. 13886160.4, Extended European Search Report dated Jul. 10, 2015, 6 pages.

Partial English Translation and Abstract of Chinese Patent Application No. CN101854624A, Jan. 28, 2015, 5 pages.

Partial English Translation and Abstract of Chinese Patent Application No. CN103065098A, Jan. 28, 2015, 5 pages.

Foreign Communication From a Counterpart Application, PCT Application No. PCT/CN2013/082182, English Translation of International Search Report dated May 30, 2014, 2 pages.

Foreign Communication From a Counterpart Application, PCT Application No. PCT/CN2013/082182, Written Opinion dated May 30, 2014, 4 pages.

Foreign Communication From a Counterpart Application, Chinese Application No. 201380002717.3, Chinese Office Action dated May 30, 2016, 12 pages.

* cited by examiner

PERMISSION MANAGEMENT METHOD, APPARATUS, AND TERMINAL

CROSS-REFERENCE TO RELATED APPLICATIONS

This application is a continuation of International Application No. PCT/CN2013/082182, filed on Aug. 23, 2013, which is hereby incorporated by reference in its entirety.

TECHNICAL FIELD

The present invention relates to computer technologies, and in particular, to a permission management method, apparatus, and terminal.

BACKGROUND

In an Android operating system, an application may apply for different permissions. After obtaining a required permission by applying, the application may invoke a corresponding application programming interface (API) or an application component to complete a corresponding function.

In the prior art, in a process of using an application that requires a ROOT permission, if the ROOT permission is not obtained, a function that requires the ROOT permission in the application cannot be normally used; or if the ROOT permission is obtained, the application can normally run, that is, control a system, for example, manage and control a permission of an application.

However, considering security, a developer of a mobile terminal does not provide the ROOT permission for a user; therefore, when using the mobile terminal whose ROOT permission is not available to the user, the user cannot normally use a function corresponding to the ROOT permission, for example, control of or access to a system of the mobile terminal.

SUMMARY

Embodiments of the present invention provide a permission management method, apparatus, and terminal, which are used to implement control of or access to a system of a mobile terminal by a user.

According to a first aspect of the present invention, a permission management method is provided, including obtaining an installation package of a first application program, where the installation package carries a first certificate and permission request information of the first application program; determining, according to the permission request information, a first permission that the first application program requires during running, where the first permission is a system administrator permission of a system; and granting the first permission to the first application program according to the first certificate of the first application program.

In a first possible implementation manner of the first aspect, the granting the first permission to the first application program according to the first certificate of the first application program includes determining whether a second certificate is stored in a trustworthy certificate list, where the second certificate is a certificate that is found in the trustworthy certificate list using index information in the first certificate, and at least a certificate that allows to be granted to an application program is stored in the trustworthy certificate list; and if it is determined that the second certificate is stored in the trustworthy certificate list, granting the first permission to the first application program; or if it is determined that the second certificate is not stored in the trustworthy certificate list, granting a second permission to the first application program, where the second permission is a permission that is opened to the first application program by the system developer and the mobile terminal manufacturer, or prompting a user to save the second certificate in a user trustworthy certificate list, and after the user saves the second certificate in the user trustworthy certificate list, granting the first permission to the first application program, where a certificate trusted by the user is stored in the user trustworthy certificate list.

With reference to the first possible implementation manner of the first aspect, in a second possible implementation manner of the first aspect, after the determining that the second certificate is stored in the trustworthy certificate list, the method further includes determining whether permission information corresponding to the second certificate in the trustworthy certificate list includes the first permission; and if yes, granting the first permission to the first application program; or if no, granting the second permission to the first application program.

In a third possible implementation manner of the first aspect, the granting the first permission to the first application program according to the first certificate of the first application program includes determining whether a second certificate is stored in a trustworthy certificate list, where the second certificate is a certificate that is found using index information in an upper-level certificate of the first certificate, and at least a certificate that allows to be granted to an application program is stored in the trustworthy certificate list; and if yes, granting the first permission to the first application program; or if no, granting a second permission to the first application program, where the second permission is a permission that is opened to the first application program by the system developer and the mobile terminal manufacturer.

With reference to the first possible implementation manner of the first aspect or the second possible implementation manner of the first aspect or the third possible implementation manner of the first aspect, in a fourth possible implementation manner of the first aspect, before the granting the first permission to the first application program, the method further includes determining, according to the second certificate and signature information in the first application program, whether the installation package of the first application program is complete; and if the installation package of the first application program is not complete, terminating all operations; or if the installation package of the first application program is complete, granting the first permission to the first application program.

With reference to any one of the first possible implementation manner of the first aspect to the fourth possible implementation manner of the first aspect, in a fifth possible implementation manner of the first aspect, the trustworthy certificate list is placed in a mobile terminal or a server.

With reference to any one of the first aspect to the fifth possible implementation manner of the first aspect, in a sixth possible implementation manner of the first aspect, before the granting the first permission to the first application program, the method further includes setting the first permission in the system.

With reference to any one of the first aspect to the sixth possible implementation manner of the first aspect, in a seventh possible implementation manner of the first aspect, after the granting the first permission to the first application program, the method further includes receiving update information sent by the mobile terminal manufacturer, where the update information carries an index of a third certificate, a third permission configured in the third certificate, and an operation instruction, the operation instruction is used to delete or add the third permission corresponding to the third certificate, and the third certificate has been set in the trustworthy certificate list; deleting or adding, according to the update information, the third permission corresponding to the third certificate in the trustworthy certificate list; and if the third permission corresponding to the third certificate in the trustworthy certificate list is deleted according to the update information, skipping granting the third permission to a second application program, where the second application program is an application program that is signed using the third certificate; or if the third permission corresponding to the third certificate in the trustworthy certificate list is added according to the update information, granting the third permission to a second application program, where the second application program is an application program that is signed using the third certificate.

With reference to any one of the first aspect to the sixth possible implementation manner of the first aspect, in an eighth possible implementation manner of the first aspect, after the granting the first permission to the first application program, the method further includes receiving update information sent by the mobile terminal manufacturer, where the update information carries a third certificate and an operation instruction, and the operation instruction is used to add the third certificate to or delete the third certificate from the trustworthy certificate list; according to the update information, adding the third certificate to the trustworthy certificate list, or deleting the third certificate from the trustworthy certificate list; and if the third certificate is added to the trustworthy certificate list, granting a permission corresponding to the third certificate to a second application program, where the second application program is an application program that is signed using the third certificate; or if the third certificate is deleted from the trustworthy certificate list, skipping granting a permission corresponding to the third certificate to a second application program, where the second application program is an application program that is signed using the third certificate.

According to a second aspect of the present invention, a permission management apparatus is provided, including an obtaining module, configured to obtain an installation package of a first application program, where the installation package carries a first certificate and permission request information of the first application program; a determining module, configured to determine, according to the permission request information, a first permission that the first application program requires during running, where the first permission is a system administrator permission of a system; and a granting module, configured to grant the first permission to the first application program according to the first certificate of the first application program.

In a first possible implementation manner of the second aspect, the determining module is configured to determine whether a second certificate is stored in a trustworthy certificate list, where the second certificate is a certificate that is found in the trustworthy certificate list using index information in the first certificate, and at least a certificate that allows to be granted to an application program is stored in the trustworthy certificate list; and the granting module is configured to, if it is determined that the second certificate is stored in the trustworthy certificate list, grant the first permission to the first application program; or if it is determined that the second certificate is not stored in the trustworthy certificate list, grant a second permission to the first application program, where the second permission is a permission that is opened to the first application program by the system developer and the mobile terminal manufacturer, or prompt a user to save the second certificate in a user trustworthy certificate list, and after the user saves the second certificate in the user trustworthy certificate list, grant the first permission to the first application program, where a certificate trusted by the user is stored in the user trustworthy certificate list.

With reference to the first possible implementation manner of the second aspect, in a second possible implementation manner of the second aspect, the determining module is further configured to determine whether permission information corresponding to the second certificate in the trustworthy certificate list includes the first permission; and the granting module is further configured to, if it is determined that the permission information corresponding to the second certificate in the trustworthy certificate list includes the first permission, grant the first permission to the first application program; or if it is determined that the permission information corresponding to the second certificate in the trustworthy certificate list does not include the first permission, grant the second permission to the first application program.

In a third possible implementation manner of the second aspect, the determining module is further configured to determine whether a second certificate is stored in a trustworthy certificate list, where the second certificate is a certificate that is found using index information in an upper-level certificate of the first certificate, and at least a certificate that allows to be granted to an application program is stored in the trustworthy certificate list; and the granting module is further configured to, if it is determined that the second certificate is stored in the trustworthy certificate list, grant the first permission to the first application program; or if it is determined that the second certificate is not stored in the trustworthy certificate list, grant a second permission to the first application program, where the second permission is a permission that is opened to the first application program by the system developer and the mobile terminal manufacturer.

With reference to the first possible implementation manner of the second aspect or the second possible implementation manner of the second aspect or the third possible implementation manner of the second aspect, in a fourth possible implementation manner of the second aspect, the determining module is further configured to determine, according to the second certificate and signature information in the first application program, whether the installation package of the first application program is complete; and the granting module is further configured to, if the determining module determines that the installation package of the first application program is not complete, terminate all operations; or if the determining module determines that the installation package of the first application program is complete, grant the first permission to the first application program.

With reference to any one of the first possible implementation manner of the second aspect to the fourth possible implementation manner of the second aspect, in a fifth possible implementation manner of the second aspect, the trustworthy certificate list is placed in a mobile terminal or a server.

With reference to any one of the second aspect to the fifth possible implementation manner of the second aspect, in a sixth possible implementation manner of the second aspect, the apparatus further includes a setting module, configured to set the first permission in the system.

With reference to any one of the second aspect to the sixth possible implementation manner of the second aspect, in a seventh possible implementation manner of the second aspect, the apparatus further includes a receiving module, configured to receive update information sent by the mobile terminal manufacturer, where the update information carries an index of a third certificate, a third permission configured in the third certificate, and an operation instruction, the operation instruction is used to indicate deletion or adding of the third permission corresponding to the third certificate, and the third certificate has been set in the trustworthy certificate list; an updating module, configured to delete or add, according to the update information, the third permission corresponding to the third certificate in the trustworthy certificate list; and a processing module, configured to delete, according to the update information, the third permission corresponding to the third certificate in the trustworthy certificate list, and skip granting the third permission to a second application program; or add, according to the update information, the third permission corresponding to the third certificate in the trustworthy certificate list, and grant the third permission to a second application program, where the second application program is an application program that is signed using the third certificate.

With reference to any one of the second aspect to the sixth possible implementation manner of the second aspect, in an eighth possible implementation manner of the second aspect, a receiving module is configured to receive update information sent by the mobile terminal manufacturer, where the update information carries a third certificate and an operation instruction, and the operation instruction is used to add the third certificate to or delete the third certificate from the trustworthy certificate list; an updating module is further configured to, according to the update information, add the third certificate to the trustworthy certificate list, or delete the third certificate from the trustworthy certificate list; and a processing module is further configured to, after the updating module adds the third certificate to the trustworthy certificate list, grant a permission corresponding to the third certificate to a second application program; or after the updating module deletes the third certificate from the trustworthy certificate list, skip granting a permission corresponding to the third certificate to a second application program, where the second application program is an application program that is signed using the third certificate.

According to a third aspect of the present invention, a terminal is provided, including a receiver, and a processor connected to the receiver, where the receiver is configured to obtain an installation package of a first application program, where the installation package carries a first certificate and permission request information of the first application program; and the processor is configured to determine, according to the permission request information, a first permission that the first application program requires during running, where the first permission is a system administrator permission of a system; and grant the first permission to the first application program according to the first certificate of the first application program.

In a first possible implementation manner of the third aspect, the processor is configured to determine whether a second certificate is stored in a trustworthy certificate list, where the second certificate is a certificate that is found in the trustworthy certificate list using index information in the first certificate, and at least a certificate that allows to be granted to an application program is stored in the trustworthy certificate list; and if it is determined that the second certificate is stored in the trustworthy certificate list, grant the first permission to the first application program; or if it is determined that the second certificate is not stored in the trustworthy certificate list, grant a second permission to the first application program, where the second permission is a permission that is opened to the first application program by the system developer and the mobile terminal manufacturer, or prompt a user to save the second certificate in a user trustworthy certificate list, and after the user saves the second certificate in the user trustworthy certificate list, grant the first permission to the first application program, where a certificate trusted by the user is stored in the user trustworthy certificate list.

With reference to the first possible implementation manner of the third aspect, in a second possible implementation manner of the third aspect, the processor is further configured to determine whether permission information corresponding to the second certificate in the trustworthy certificate list includes the first permission; and if it is determined that the permission information corresponding to the second certificate in the trustworthy certificate list includes the first permission, grant the first permission to the first application program; or if it is determined that the permission information corresponding to the second certificate in the trustworthy certificate list does not include the first permission, grant the second permission to the first application program.

In a third possible implementation manner of the third aspect, the processor is further configured to determine whether a second certificate is stored in a trustworthy certificate list, where the second certificate is a certificate that is found using index information in an upper-level certificate of the first certificate, and at least a certificate that allows to be granted to an application program is stored in the trustworthy certificate list; and if it is determined that the second certificate is stored in the trustworthy certificate list, grant the first permission to the first application program; or if it is determined that the second certificate is not stored in the trustworthy certificate list, grant a second permission to the first application program, where the second permission is a permission that is opened to the first application program by the system developer and the mobile terminal manufacturer.

With reference to the first possible implementation manner of the third aspect or the second possible implementation manner of the third aspect or the third possible implementation manner of the third aspect, in a fourth possible implementation manner of the third aspect, the processor is further configured to determine, according to the second certificate and signature information in the first application program, whether the installation package of the first application program is complete; and if the determining module determines that the installation package of the first application program is not complete, terminate all operations; or if the determining module determines that the installation package of the first application program is complete, grant the first permission to the first application program.

With reference to any one of the first possible implementation manner of the third aspect to the fourth possible implementation manner of the third aspect, in a fifth possible implementation manner of the third aspect, the trustworthy certificate list is placed in a mobile terminal or a server.

With reference to any one of the third aspect to the fifth possible implementation manner of the third aspect, in a sixth possible implementation manner of the third aspect, the processor is further configured to set the first permission in the system.

With reference to any one of the third aspect to the sixth possible implementation manner of the third aspect, in a seventh possible implementation manner of the third aspect, the receiver is further configured to receive update information sent by the mobile terminal manufacturer, where the update information carries an index of a third certificate, a third permission configured in the third certificate, and an operation instruction, the operation instruction is used to indicate deletion or adding of the third permission corresponding to the third certificate, and the third certificate has been set in the trustworthy certificate list; the processor is further configured to delete or add, according to the update information, the third permission corresponding to the third certificate in the trustworthy certificate list; or, the processor is further configured to delete, according to the update information, the third permission corresponding to the third certificate in the trustworthy certificate list, and skip granting the third permission to a second application program; or add, according to the update information, the third permission corresponding to the third certificate in the trustworthy certificate list, and grant the third permission to a second application program, where the second application program is an application program that is signed using the third certificate.

With reference to any one of the third aspect to the sixth possible implementation manner of the third aspect, in an eighth possible implementation manner of the third aspect, the receiver is configured to receive update information sent by the mobile terminal manufacturer, where the update information carries a third certificate and an operation instruction, and the operation instruction is used to add the third certificate to or delete the third certificate from the trustworthy certificate list; and the processor is further configured to, according to the update information, add the third certificate to the trustworthy certificate list, or delete the third certificate from the trustworthy certificate list; or, the processor is further configured to, after the third certificate is added to the trustworthy certificate list, grant a permission corresponding to the third certificate to a second application program; or after the third certificate is deleted from the trustworthy certificate list, skip granting a permission corresponding to the third certificate to a second application program, where the second application program is an application program that is signed using the third certificate.

In the permission management method, apparatus, and terminal provided by the embodiments of the present invention, an installation package of a first application program is obtained, where the installation package carries a first certificate and permission request information of the first application program; a first permission that the first application program requires during running is determined according to the permission request information, where the first permission is a system administrator permission of a system; and the first permission is granted to the first application program according to the first certificate of the first application program, so that the first permission that the first application program requires during running is granted to the first application program. In this way, control of or access to a system of a mobile terminal by a user can be implemented.

BRIEF DESCRIPTION OF DRAWINGS

To describe technical solutions in embodiments of the present invention more clearly, the following briefly introduces accompanying drawings required for describing the embodiments or the prior art. The accompanying drawings in the following description show some embodiments of the present invention, and persons of ordinary skill in the art may still derive other drawings from these accompanying drawings without creative efforts.

DESCRIPTION OF EMBODIMENTS

To make objectives, technical solutions, and advantages of embodiments of the present invention clearer, the following clearly describes the technical solutions in the embodiments of the present invention with reference to accompanying drawings in the embodiments of the present invention. The described embodiments are a part rather than all of the embodiments of the present invention. All other embodiments obtained by persons of ordinary skill in the art based on the embodiments of the present invention without creative efforts shall fall within a protection scope of the present invention.

A permission management method provided by embodiments of the present invention may be applied to installation of a third-party application program in a mobile terminal, where the mobile terminal may be a smartphone, or the like. The permission management method provided by the embodiments may be executed by a permission management apparatus, where the permission management apparatus may be integrated into the mobile terminal, and the permission management apparatus may be implemented using software and/or hardware. The following describes in detail the permission management method and apparatus provided by the embodiments.

Figure 1:
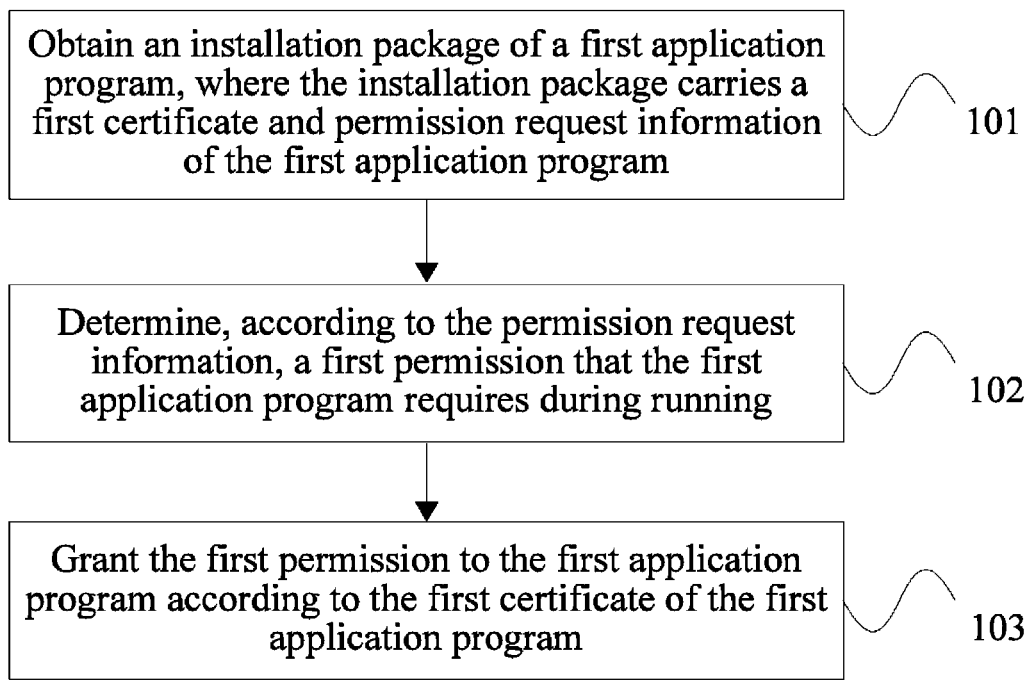
FIG. 1 is a flowchart of an embodiment of a permission management method according to the present invention.

FIG. 1 is a flowchart of an embodiment of a permission management method according to the present invention. As shown in FIG. 1, the method in this embodiment may include the following steps.

Step 101: Obtain an installation package of a first application program, where the installation package carries a first certificate and permission request information of the first application program.

In this embodiment, the first certificate may be a certificate that is used when a third-party application developer signs the first application program. The first certificate may include a public key of the first certificate, an index of the first certificate, owner information of the first certificate, an encryption algorithm of the first certificate, and the like. The third-party application developer may be an application developer except a system developer and a mobile terminal manufacturer.

The permission request information in this embodiment may be permission information which needs to be applied for when the first application program is run; and generally the permission request information is set in a configuration file of the installation package, for example, when the configuration file is an AndroidManifest.xml file, the configuration file includes at least the permission request information and a name of the first application program.

Step 102: Determine, according to the permission request information, a first permission that the first application program requires during running.

In this embodiment, a terminal may determine, according to the permission request information, a permission that the first application program requires during running; that is, the first application program can invoke a corresponding API or application component only when having a required permission, so as to complete a corresponding function, where the permission that the first application program requires during running may include the first permission and/or a second permission.

The first permission is a system administrator permission of a system. The system administrator permission of the system may be a ROOT_PERMISSION permission.

For example, the system administrator permission of the system may be used to store audio and video information and configuration information in the system, run an application program in the system, or the like.

The second permission may be a common permission, which is a permission that is opened to a third-party application program by a system developer and a mobile terminal manufacturer. For example, in an Android operating system, 134 types of common permissions may be applied for, and these common permissions are stored in an AndroidManifest.xml file.

Step 103: Grant the first permission to the first application program according to the first certificate of the first application program.

In this embodiment, the first certificate is a certificate for signing the first application program, and the first permission is granted to the first application program according to the first certificate of the first application program in at least two implementation manners.

In a first implementation manner, it is determined, according to the first certificate of the first application program, that first certificate information is stored in a trustworthy certificate list, and then the first permission is granted to the first application program.

It is determined whether a second certificate is stored in the trustworthy certificate list, where the second certificate is a certificate that is found in the trustworthy certificate list using index information in the first certificate, at least a certificate that allows to be granted to an application program is stored in the trustworthy certificate list, and a mobile terminal manufacturer configures the trustworthy certificate list. It should be noted that, the second certificate is a certificate that is found in the trustworthy certificate list using the index information in the first certificate; and in this case, the second certificate is the first certificate, and the index information in the first certificate is not tampered with. After the index information of the first certificate is tampered with, a certificate that is found in the trustworthy certificate list using the index information in the first certificate is not the first certificate, and in this case, the second certificate is different from the first certificate.

If it is determined that the second certificate is stored in the trustworthy certificate list, the first permission is granted to the first application program; or if it is determined that the second certificate is not stored in the trustworthy certificate list, a second permission is granted to the first application program, or a user is prompted to save the second certificate in a user trustworthy certificate list, and after the user saves the second certificate in the user trustworthy certificate list, the first permission is granted to the first application program, where a certificate trusted by the user is stored in the user trustworthy certificate list. The user trustworthy certificate list may include a certificate trusted by the user and maintained by the user. After the user saves the certificate in the user trustworthy certificate list, a permission corresponding to the certificate may be granted to an application program.

No matter whether the second certificate is originally stored in the trustworthy certificate list or the user saves the second certificate in the trustworthy certificate list after being prompted, that is, after it is determined that the second certificate is stored in the trustworthy certificate list, further, it can be determined whether permission information corresponding to the second certificate in the trustworthy certificate list includes the first permission; and if yes, the first permission is granted to the first application program; or if no, the second permission is granted to the first application program, where the second permission is a permission that is opened to the first application program by a system developer and a mobile terminal manufacturer.

In a second implementation manner, it is determined, according to the first certificate of the first application program, that an upper-level certificate of the first certificate is stored in a trustworthy certificate list, and the first permission is granted to the first application program.

It is determined whether a second certificate is stored in the trustworthy certificate list, where the second certificate is a certificate that is found using index information in the upper-level certificate of the first certificate, and at least a certificate that allows to be granted to an application program is stored in the trustworthy certificate list; and if yes, the first permission is granted to the first application program; or if no, a second permission is granted to the first application program.

In this embodiment, the installation package of the first application program is obtained, where the installation package carries the first certificate and the permission request information of the first application program; the first permission that the first application program requires during running is determined according to the permission request information, where the first permission is the system administrator permission of the system; and then, the first permission is granted to the first application program according to the first certificate of the first application program. The first permission that the first application program requires during running is granted to the first application program, and in this way, access to a system of a mobile terminal by a user can be implemented.

It should be noted that, in the foregoing embodiment, in step 103, before the granting the first permission to the first application program, the method may further include determining, according to the second certificate and signature information in the first application program, whether the installation package of the first application program is complete; and if the installation package of the first application program is not complete, terminating all operations; or if the installation package of the first application program is complete, granting the first permission to the first application program.

For example, using the first certificate information of the first application program, such as a hash algorithm recorded in a CERT.RSA file, hash calculation is performed on a file in the installation package of the first application program, to obtain a hash value H1. Next, a signature of the first application program, such as signature information in CERT.SF, is decrypted using a public key recorded in the second certificate, to obtain a hash value H2. H1 is compared with H2. If H1 is equal to H2, it is determined that the installation package of the first application program is complete; otherwise, the installation package is not complete, and all operations are terminated.

Based on the foregoing embodiment, the trustworthy certificate list may be placed in the mobile terminal or a server.

Further, based on the foregoing embodiment, the terminal may further receive update information sent by the mobile terminal manufacturer, and there may be at least two applicable scenarios.

In a first applicable scenario, a corresponding operation is performed on a third permission configured in a third certificate that has been stored in the trustworthy certificate list, where the third permission may be a permission that is opened to an application program by an application developer except the system developer and the mobile terminal manufacturer, or the third permission may also be a permission that is opened to an application program by the system developer and the mobile terminal manufacturer.

The update information sent by the mobile terminal manufacturer is received, where the update information carries an index of the third certificate, the third permission configured in the third certificate, and an operation instruction, the operation instruction is used to delete or add the third permission corresponding to the third certificate, and the third certificate has been set in the trustworthy certificate list; the trustworthy certificate list is updated according to the update information, and the third permission corresponding to the third certificate in the trustworthy certificate list is deleted or added; and if the third permission corresponding to the third certificate in the trustworthy certificate list is deleted according to the update information, the third permission is not granted to a second application program, where the second application program is an application program that is signed using the third certificate; or if the third permission corresponding to the third certificate in the trustworthy certificate list is added according to the update information, the third permission is granted to a second application program, where the second application program is an application program that is signed using the third certificate.

In a second applicable scenario, a corresponding operation is performed on a third certificate that has been stored in the trustworthy certificate list.

The terminal receives the update information sent by the mobile terminal manufacturer, where the update information carries the third certificate and an operation instruction, the operation instruction is used to add the third certificate to or delete the third certificate from the trustworthy certificate list, and it should be noted that, after the third certificate is added to the trustworthy certificate list, a permission corresponding to the third certificate may be accordingly added; according to the update information, the third certificate is added to the trustworthy certificate list, or the third certificate is deleted from the trustworthy certificate list; and if the third certificate is added to the trustworthy certificate list, a permission corresponding to the third certificate is granted to a second application program, where the second application program is an application program that is signed using the third certificate; or if the third certificate is deleted from the trustworthy certificate list, a permission corresponding to the third certificate is not granted to a second application program, where the second application program is an application program that is signed using the third certificate.

Figure 2:
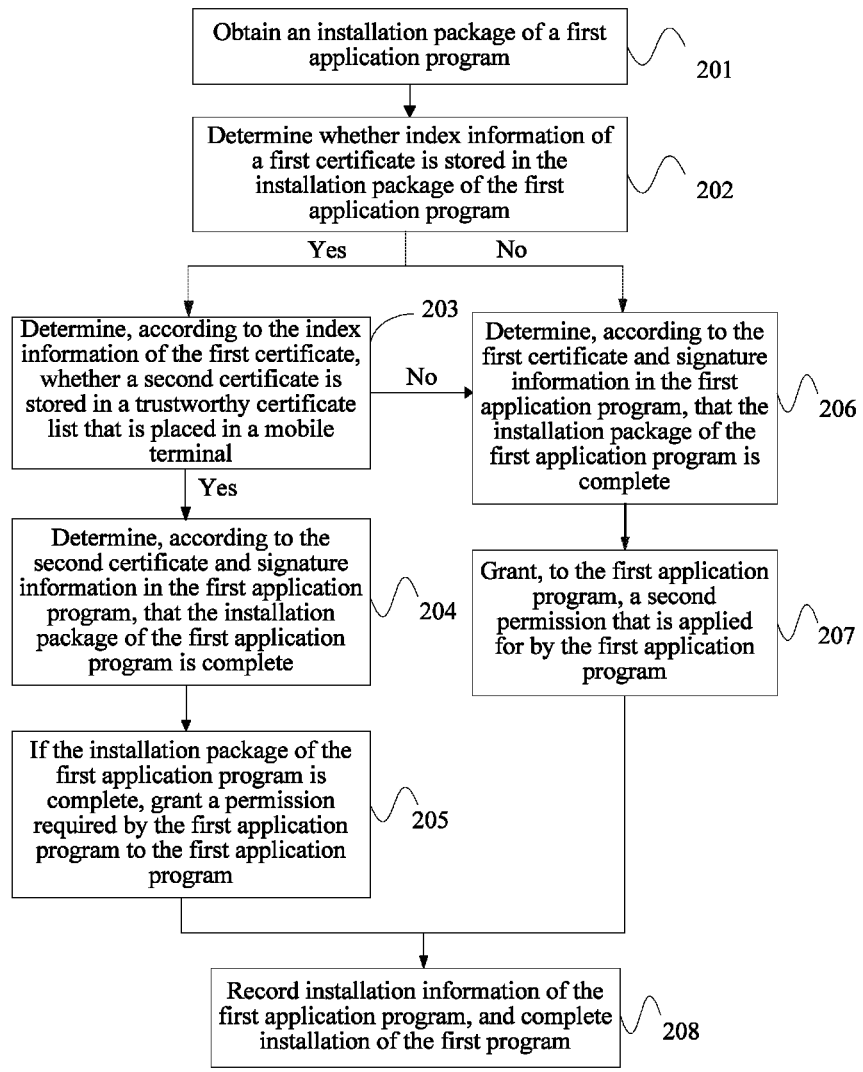
FIG. 2 is a flowchart of another embodiment of a permission management method according to the present invention.

FIG. 2 is a flowchart of another embodiment of a permission management method according to the present invention. As shown in FIG. 2, the method in this embodiment may include the following steps.

Step 201: Obtain an installation package of a first application program.

When the first application program is installed in a mobile terminal, the installation package of the first application program may be obtained, and a first certificate and permission request information of the first application program are obtained from the installation package, that is, an .apk file. For example, the first certificate may include a public key of the first certificate, owner information of the first certificate, an encryption algorithm of the first certificate, and the like.

It should be noted that, a third-party application developer may sign a first application program S using a first certificate A, and a signing method may be a general signing method. For example, first, hash calculation may be performed on all content of the first application program to obtain a hash value H; next, an encryption algorithm corresponding to the first certificate A, that is, a private key, is used to encrypt the hash value H, that is, the hash value H is signed, and a signature value is obtained; and then, the first certificate A and the signature value are added to the first application program, and the first application program is compressed and packed into the installation package, that is, the .apk file.

Step 202: Determine whether index information of a first certificate is stored in the installation package of the first application program.

It should be noted that, a second certificate is a certificate that is found in a trustworthy certificate list using the index information in the first certificate, and in this case, the second certificate is the first certificate.

First, it is determined whether a first certificate of a first application program S includes index information of the first certificate, where the index information of the first certificate is information that can uniquely identify the first certificate. For example, the index information of the first certificate may be public key information of the first certificate, and may also be number information of the first certificate, or other information that can uniquely identify the certificate, such as, a serial number of the certificate.

If it is determined that the index information of the first certificate is stored in the installation package of the first application program, step 203 is executed; or if it is determined that the index information of the first certificate is not stored in the installation package of the first application program, step 206 is executed.

Step 203: Determine, according to the index information of the first certificate, whether a second certificate is stored in a trustworthy certificate list that is placed in a mobile terminal.

If it is determined that the second certificate is stored in the trustworthy certificate list in the mobile terminal, step 204 is executed, and the second certificate is the first certificate.

If it is determined that the second certificate is not stored in the trustworthy certificate list in the mobile terminal, step 206 is executed.

Further, based on the foregoing embodiment, if the second certificate is not found in the trustworthy certificate list according to the index information of the first certificate, indication information may be sent to a user that uses the mobile terminal, where the indication information may prompt the user to add the first certificate carried in the installation package of the first application program to a user trustworthy certificate list, and configure a permission required by the first application program carrying the first certificate, such as, a ROOT_PERMISSION permission. If the user adds the first certificate to the user trustworthy certificate list, step 204 is executed; or if the user refuses to add the first certificate to the trustworthy certificate list trusted by the user, step 206 is executed.

It should be noted that, the trustworthy certificate list may be placed in the mobile terminal by a mobile terminal manufacturer in advance, and may also be created additionally by the user. In addition, the trustworthy certificate list may be stored in a read-only memory (ROM) of the mobile terminal; specific implementation is not limited, and any storage medium in the mobile terminal may be used. Further, the mobile terminal manufacturer may further encrypt and store the trustworthy certificate list, so as to prevent, by encryption, the trustworthy certificate list from being tampered with.

In this embodiment, there are at least two specific implementation manners for the trustworthy certificate list. In a first implementation manner, the trustworthy certificate list is separately placed in the mobile terminal, and a permission corresponding to a certificate stored in the trustworthy certificate list is searched for in a permission list using an indexing method. In a second implementation manner, a permission list and the trustworthy certificate list are combined into one entity, that is, in the permission list, corresponding permission information is configured after each certificate stored in the trustworthy certificate list.

Step 204: Determine, according to the second certificate and signature information in the first application program, that the installation package of the first application program is complete.

For example, a method for determining that the installation package of the first application program is complete may be, first, performing hash calculation on a file in an installation package of a first application program S using a first certificate of the first application program, such as a hash algorithm recorded in a CERT.RSA file, is performed to obtain a hash value H1; next, decrypting a signature of the first application program, such as signature information in CERT.SF, using a public key stored in the second certificate, to obtain a hash value H2; and then, comparing H1 with H2. If H1 is not equal to H2, the installation package in not complete, and therefore, any operation is terminated; or if H1 is equal to H2, the installation package is complete, and therefore, step 205 is executed.

Step 205: If the installation package of the first application program is complete, grant a permission required by the first application program to the first application program.

It should be noted that, the permission required by the first application program may include a first permission and a second permission, where the first permission is a system administrator permission of a system, for example, the system administrator permission of the system may be used to store audio and video information and configuration information in the system, run an application program in the system, or the like. The second permission is a permission that is jointly developed by a system developer and a mobile terminal manufacturer for a third-party application program. The system administrator permission of the system is a ROOT_PERMISSION permission.

A method for granting the first permission to the first application program may be determining that a permission list corresponding to the second certificate stored in the trustworthy certificate list includes the first permission, and therefore, adding the first permission to a permission list of the first application program. At the same time, the second permission may further be granted to the first application program.

Step 206: Determine, according to the first certificate and the signature information in the first application program, that the installation package of the first application program is complete.

For example, a method for determining that the installation package is complete may be, first, performing hash calculation on all files except a signature file in the installation package of a first application program S using first certificate information recorded in the first application program, such as a hash algorithm recorded in a CERT.RSA file, to obtain a hash value H1; next, decrypting signature data, such as signature information in CERT.SF, using a public key in the signature CERT.RSA file of the first application program, to obtain a hash value H2; and then, comparing H1 with H2. If H1 is equal to H2, the installation package is complete, and subsequent step 207 is executed; otherwise, the installation package is not complete, and any operation is terminated.

Step 207: Grant, to the first application program, a second permission that is applied for by the first application program.

In this embodiment, the second permission is a permission that is opened to the first application program by a system developer and a mobile terminal manufacturer.

Step 208: Record installation information of the first application program, and complete installation of the first program.

In this embodiment, after the first application program is granted the first permission and/or the second permission, information about a first application program S is recorded in an application information record file packages.xml, where the information recorded in the application information record file packages.xml includes a name of the first application program S, information about a permission granted to the first application program S, and the like.

It should be noted that, based on the foregoing embodiment, before step 201, the first permission may be added to a system first, for example, a ROOT_PERMISSION permission is added to an Android system.

Further, another implementation manner of this embodiment is basically similar to the foregoing embodiment shown in FIG. 2, and a difference is that the trustworthy certificate list is placed on a server.

It should be noted that, a user trustworthy certificate list may be placed in the mobile terminal.

Figure 3:
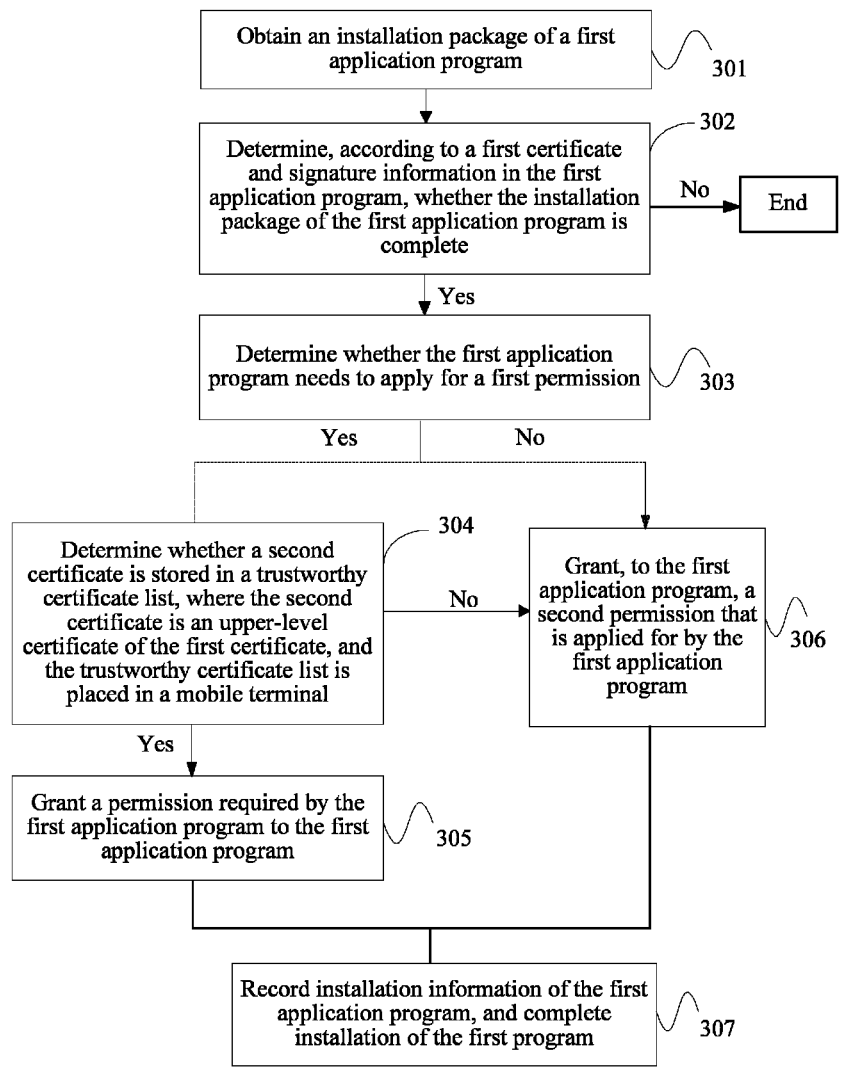
FIG. 3 is a flowchart of still another embodiment of a permission management method according to the present invention.
Figures 4, 5:
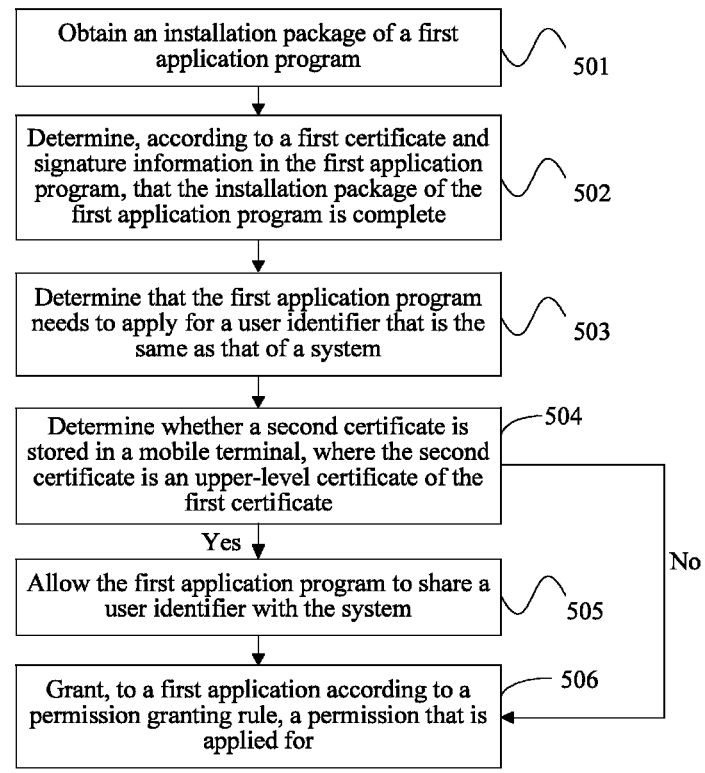
FIG. 4 is a schematic diagram of a certificate revocation list in a permission management method according to the present invention.
FIG. 5 is a flowchart of still another embodiment of a permission management method according to the present invention.

FIG. 3 is a flowchart of still another embodiment of a permission management method according to the present invention, and FIG. 4 is a schematic diagram of a certificate revocation list in a permission management method according to the present invention. As shown in FIG. 3, the method in this embodiment may include the following steps.

Step 301: Obtain an installation package of a first application program.

An implementation principle of step 301 in this embodiment is similar to that of step 201 shown in FIG. 2, which will not be described herein again.

Step 302: Determine, according to a first certificate and signature information in the first application program, whether the installation package of the first application program is complete.

For example, a method for determining that the installation package of the first application program is complete may be, first, performing hash calculation on a file in an installation package of a first application program S using a first certificate in the first application program, such as a hash algorithm recorded in a CERT.RSA file, to obtain a hash value H1; next, decrypting a signature of the first application program, such as signature information in CERT.SF, using a public key in the first application program, to obtain a hash value H2; and then, comparing H1 with H2. If H1 is not equal to H2, the installation package in not complete, and therefore, any operation is terminated; or if H1 is equal to H2, the installation package is complete.

Step 303: Determine whether the first application program needs to apply for a first permission.

A permission that the first application program needs to apply for in this embodiment includes the first permission and a second permission, where the first permission is a system administrator permission of a system, and the system administrator permission of the system is a ROOT_PERMISSION permission. For example, the system administrator permission of the system may be used to store audio and video information and configuration information in the system, run an application program in the system, or the like. The second permission may be a permission that is jointly developed by a system developer and a mobile terminal manufacturer for a third-party application program.

If the first application program needs to apply for the first permission, step 304 is executed; or if the first application program does not need to apply for the first permission, step 306 is executed.

Step 304: Determine whether a second certificate is stored in a trustworthy certificate list, where the second certificate is an upper-level certificate of the first certificate, and the trustworthy certificate list is placed in a mobile terminal.

In this embodiment, the second certificate is the upper-level certificate of the first certificate in the first application program, that is, the second certificate is a certificate that is found using index information in the upper-level certificate of the first certificate.

In addition, for how to determine whether installation is complete, the following manner may be used: first, hash calculation is performed on the first certificate using a hash algorithm that is used when the first certificate is signed, to obtain a hash value H1; next, a signature in the first certificate, such as signature information in CERT.SF, is decrypted using a public key stored in the second certificate, to obtain a hash value H2; and then, H1 is compared with H2. If H1 is equal to H2, it may be determined, using the second certificate, that the installation package of the first application program is complete, that is, it is determined that the second certificate corresponding to the first certificate is stored in the trustworthy certificate list, and step 305 is executed. If H1 is not equal to H2, step 306 is executed; or when it is determined that H1 is not equal to H2, a user is prompted to add the first certificate to a user trustworthy certificate list. If the user adds the first certificate to the user trustworthy certificate list, step 305 is executed; otherwise, step 306 is executed.

Further, before hash calculation is performed on the first certificate to obtain the hash value H1, it may be determined whether the first certificate has been revoked. For example, it is determined, according to the certificate revocation list shown in FIG. 4, whether the first certificate is stored in the first certificate, where information about a revoked certificate is stored in the certificate revocation list, and the certificate revocation list is placed in the mobile terminal. If it is determined that the first certificate is stored in the certificate revocation list, for example, the first certificate is numbered C00001 and is stored in the list shown in FIG. 4, and then it is confirmed that the first certificate has been revoked, and an operation of granting the first permission to the first application program is terminated; or if it is determined that the first certificate is not stored in the certificate revocation list, it is confirmed that the first certificate has not been revoked, and then hash calculation may be performed on the first certificate to obtain the hash value H1.

It should be noted that, a mobile terminal manufacturer may generate, using a second certificate of the mobile terminal manufacturer, a sub-certificate of the second certificate, that is, the first certificate, for an application developer trusted by the mobile terminal manufacturer. A generation process is a general sub-certificate generation process; and for example, an abstract is obtained using the hash algorithm on information about the first certificate, the abstract of the information about the first certificate is encrypted using a private key corresponding to a public key in the second certificate, to generate a signature, and the signature is stored in the first certificate.

Step 305: Grant a permission required by the first application program to the first application program.

An implementation principle of step 305 in this embodiment is similar to that of step 205 shown in FIG. 2, which will not be described herein again.

Step 306: Grant, to the first application program, a second permission that is applied for by the first application program.

Step 307: Record installation information of the first application program, and complete installation of the first program.

Implementation principles of step 306 and step 307 in this embodiment are similar to those of step 207 and step 208 shown in FIG. 2 respectively, which will not be described herein again.

It should be noted that, based on the foregoing embodiments, before step 301, the first permission may be added to a system first, for example, a ROOT_PERMISSION permission is added to an Android system.

Further, another implementation manner of this embodiment is basically similar to the foregoing embodiment shown in FIG. 3, and a difference is that the trustworthy certificate list is placed on a server.

It should be noted that, in step 304, the first certificate is stored in a user trustworthy certificate list, where the user trustworthy certificate list is also placed in the mobile terminal, as shown in FIG. 2.

FIG. 5 is a flowchart of still another embodiment of a permission management method according to the present invention. As shown in FIG. 5, the method in this embodiment may include the following steps.

Step 501: Obtain an installation package of a first application program.

Step 502: Determine, according to a first certificate and signature information in the first application program, that the installation package of the first application program is complete.

Implementation principles of step 501 and step 502 in this embodiment are similar to those of step 301 and step 302 shown in FIG. 3 respectively, which will not be described herein again.

Step 503: Determine that the first application program needs to apply for a user identifier that is the same as that of a system.

In this embodiment, a terminal may parse shared user identifier (sharedUserId) information of an application, and learn that the first application program needs to share a user identifier userId with a system user.

Step 504: Determine whether a second certificate is stored in a mobile terminal, where the second certificate is an upper-level certificate of the first certificate.

In this embodiment, if the second certificate is stored in the mobile terminal, step 505 is executed; otherwise, step 506 is executed.

A mobile terminal manufacturer may place the second certificate in the mobile terminal in advance; and it may also be that, when an application program is installed in the mobile terminal, a second certificate carried in the application program is stored in the mobile terminal, where the second certificate is the upper-level certificate of the first certificate.

Step 505: Allow the first application program to share a user identifier with the system.

Corresponding shared uid information may be recorded in packages.xml, and a record form is as follows: <package name="com.M.S" codePath="/system/app/S.apk" nativeLibraryPath="/data/data/com.M.S/lib" flags="1" ft="137c481b198" it="137c481b198" ut="137c481b198" version="1" sharedUserId="1000"><sigs count="1"><cert index="0"/></sigs></package>;

Step 506: Grant, to a first application according to a permission granting rule, a permission that is applied for.

If the second certificate is not stored in the mobile terminal, the permission that is applied for may be granted to the first application according to a permission granting rule in which the first application does not share a user identifier with the system; and if the first application program shares a user identifier with the system, the permission that is applied for may be granted to the first application according to a permission granting rule in which the first application shares a user identifier with the system.

It should be noted that, if it is determined that the first application program needs to apply for a user identifier that is not the same as that of the system, a second permission may be granted to the first application program.

Figure 6:
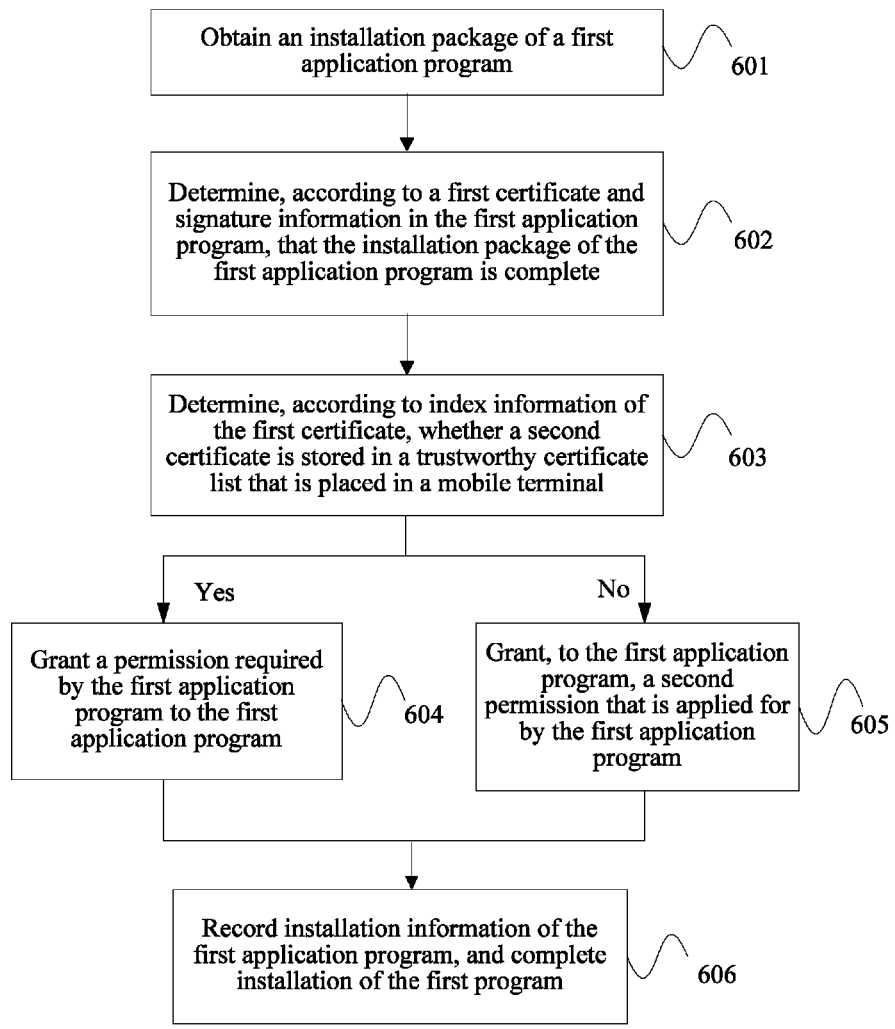
FIG. 6 is a flowchart of still another embodiment of a permission management method according to the present invention.

FIG. 6 is a flowchart of still another embodiment of a permission management method according to the present invention, as shown in FIG. 6.

Step 601: Obtain an installation package of a first application program.

Step 602: Determine, according to a first certificate and signature information in the first application program, that the installation package of the first application program is complete.

Implementation principles of step 601 and step 602 in this embodiment are similar to those of step 301 and step 302 shown in FIG. 3 respectively, which will not be described herein again.

Step 603: Determine, according to index information of the first certificate, whether a second certificate is stored in a trustworthy certificate list that is placed in a mobile terminal.

An implementation principle of step 603 in this embodiment is similar to that of step 203 shown in FIG. 2, which will not be described herein again.

It should be noted that, if it is determined that the second certificate is stored in the trustworthy certificate list in the mobile terminal, step 604 is executed.

If it is determined that the second certificate is not stored in the trustworthy certificate list in the mobile terminal, step 605 is executed.

Step 604: Grant a permission required by the first application program to the first application program.

Step 605: Grant, to the first application program, a second permission that is applied for by the first application program.

Step 606: Record installation information of the first application program, and complete installation of the first program.

Implementation principles of step 604, step 605, and step 606 in this embodiment are similar to those of step 205, step 207, and step 208 shown in FIG. 2 respectively, which will not be described herein again.

It should be noted that, based on the foregoing embodiments, before step 601, a first permission may be added to a system first, for example, a ROOT_PERMISSION permission is added to an Android system.

Further, another implementation manner of this embodiment is basically similar to the foregoing embodiment shown in FIG. 6, and a difference is that the trustworthy certificate list is placed on a server.

Figure 7:
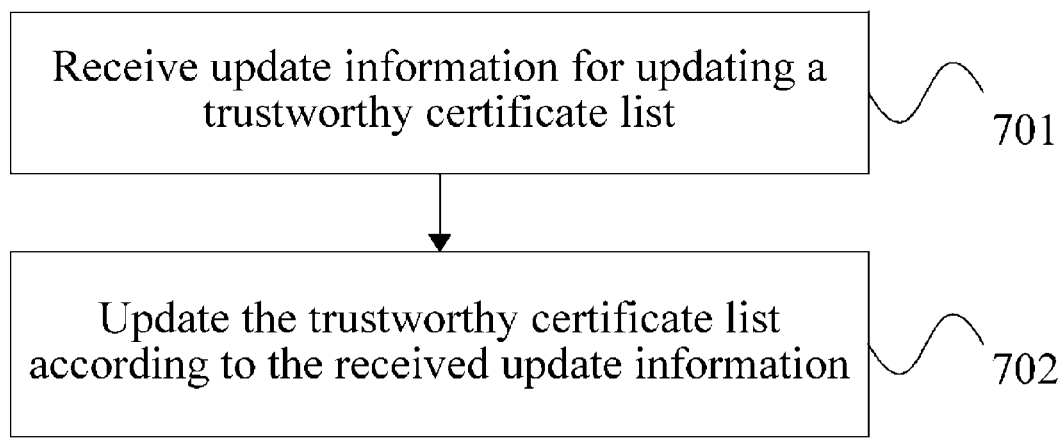
FIG. 7 is a flowchart of still another embodiment of a permission management method according to the present invention.

FIG. 7 is a flowchart of still another embodiment of a permission management method according to the present invention. As shown in FIG. 7, based on the foregoing embodiments, after installation of a first program is completed, the method may further include the following steps:

Step 701: Receive update information for updating a trustworthy certificate list.

There are at least two applicable scenarios in which a terminal may receive the update information for updating the trustworthy certificate list.

In a first applicable scenario, update information sent by a mobile terminal manufacturer is received, where the update information carries an index of a third certificate, a third permission configured in the third certificate, and an operation instruction, the operation instruction is used to delete or add the third permission corresponding to the third certificate, and the third certificate has been set in the trustworthy certificate list, where the third permission may be a system administrator permission of a system, or the third permission may also be a permission that is opened to an application program by a system developer and the mobile terminal manufacturer.

In a second applicable scenario, update information sent by a mobile terminal manufacturer is received, where the update information carries a third certificate and an operation instruction, and the operation instruction is used to add the third certificate to or delete the third certificate from the trustworthy certificate list, where a third permission may be a system administrator permission of a system, or the third permission may also be a permission that is opened to an application program by a system developer and the mobile terminal manufacturer.

It should be noted that, the mobile terminal manufacturer may send an update message to a permission management apparatus in an over-the-air (OTA) manner or another manner, and the permission management apparatus receives the update message in the OTA manner or another manner; and a manner in which the permission management apparatus obtains the update message is not limited herein.

Step 702: Update the trustworthy certificate list according to the received update information.

In this embodiment, corresponding to the application scenarios of step 701, the updating the trustworthy certificate list according to the received update information is that, in the first applicable scenario, the terminal may update the trustworthy certificate list according to the update information, so as to delete or add the third permission corresponding to the third certificate; and skip granting or grant the third permission to a second application program according to the updated trustworthy certificate list, where the second application program is an application program that is signed using the third certificate; and in the second applicable scenario, the terminal may update the trustworthy certificate list according to the update information, and skip granting or grant the third permission to the second application program according to the updated trustworthy certificate list, where the second application program is an application program that is signed using the third certificate.

Figure 8:
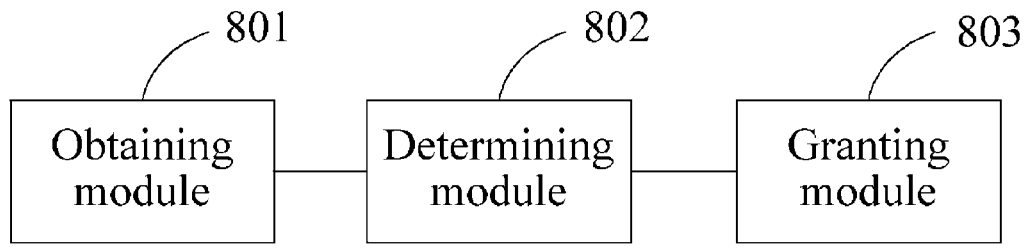
FIG. 8 is a schematic structural diagram of an embodiment of a permission management apparatus according to the present invention.

FIG. 8 is a schematic structural diagram of an embodiment of a permission management apparatus according to the present invention. As shown in FIG. 8, the permission management apparatus may be set in a mobile terminal, and may also be independently set, where the permission management apparatus includes an obtaining module 801, a determining module 802, and a granting module 803, where the obtaining module 801 is configured to obtain an installation package of a first application program, where the installation package carries a first certificate and permission request information of the first application program; the determining module 802 is configured to determine, according to the permission request information, a first permission that the first application program requires during running, where the first permission is a system administrator permission of a system; and the granting module 803 is configured to grant the first permission to the first application program according to the first certificate of the first application program.

In this embodiment, the installation package of the first application program is obtained, where the installation package carries the first certificate and the permission request information of the first application program; the first permission that the first application program requires during running is determined according to the permission request information; and the first permission is granted to the first application program according to the first certificate of the first application program. The first permission that the first application program requires when being installed or running is granted to the first application program, and in this way, control of or access to a system of the mobile terminal by a user can be implemented.

It should be noted that, the first permission is the system administrator permission of the system. The system administrator permission of the system is a ROOT_PERMISSION permission. For example, the system administrator permission of the system may be used to store audio and video information and configuration information in the system, run an application program in the system, or the like.

Based on the foregoing embodiments, the determining module 802 is configured to determine whether a second certificate is stored in a trustworthy certificate list, where the second certificate is a certificate that is found in the trustworthy certificate list using index information in the first certificate, and at least a certificate that allows to be granted to an application program is stored in the trustworthy certificate list; and the granting module 803 is configured to, if it is determined that the second certificate is stored in the trustworthy certificate list, grant the first permission to the first application program; or if it is determined that the second certificate is not stored in the trustworthy certificate list, grant a second permission to the first application program, where the second permission is a permission that is opened to the first application program by a system developer and a mobile terminal manufacturer, or prompt a user to save the second certificate in a user trustworthy certificate list, and after the user saves the second certificate in the user trustworthy certificate list, grant the first permission to the first application program, where a certificate trusted by the user is stored in the user trustworthy certificate list.

The determining module 802 is further configured to determine whether permission information corresponding to the second certificate in the trustworthy certificate list includes the first permission; and the granting module 803 is further configured to, if it is determined that the permission information corresponding to the second certificate in the trustworthy certificate list includes the first permission, grant the first permission to the first application program; or if it is determined that the permission information corresponding to the second certificate in the trustworthy certificate list does not include the first permission, grant the second permission to the first application program.

Based on the foregoing embodiments, the determining module 802 is further configured to determine whether a second certificate is stored in the trustworthy certificate list, where the second certificate is a certificate that is found using index information in an upper-level certificate of the first certificate, and at least a certificate that allows to be granted to an application program is stored in the trustworthy certificate list; and the granting module 803 is further configured to, if it is determined that the second certificate is stored in the trustworthy certificate list, grant the first permission to the first application program; or if it is determined that the second certificate is not stored in the trustworthy certificate list, grant the second permission to the first application program, where the second permission is the permission that is opened to the first application program by the system developer and the mobile terminal manufacturer.

The determining module 802 is further configured to determine, according to the second certificate and signature information in the first application program, whether the installation package of the first application program is complete; and the granting module 803 is further configured to, if the determining module 802 determines that the installation package of the first application program is not complete, terminate all operations; or if the determining module 802 determines that the installation package in the first application program is complete, grant the first permission to the first application program.

It should be noted that, the trustworthy certificate list is placed in the mobile terminal or a server.

Figure 9:
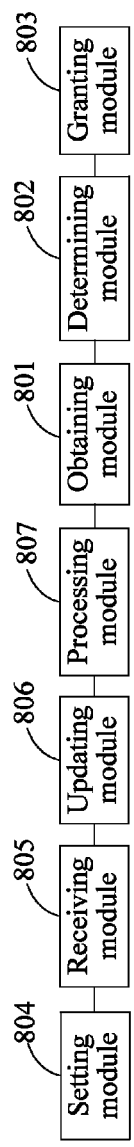
FIG. 9 is a schematic structural diagram of another embodiment of a permission management apparatus according to the present invention.

FIG. 9 is a schematic structural diagram of another embodiment of a permission management apparatus according to the present invention. As shown in FIG. 9, for the permission management apparatus, based on the foregoing embodiments, the apparatus may further include a setting module 804, configured to set the first permission in the system.

Based on the foregoing embodiments, the apparatus may further include a receiving module 805, configured to receive update information sent by a mobile terminal manufacturer, where the update information carries an index of a third certificate, a third permission configured in the third certificate, and an operation instruction, the operation instruction is used to indicate deletion or adding of the third permission corresponding to the third certificate, and the third certificate has been set in the trustworthy certificate list; an updating module 806, configured to delete or add, according to the update information, the third permission corresponding to the third certificate in the trustworthy certificate list; and a processing module 807, configured to delete, according to the update information, the third permission corresponding to the third certificate in the trustworthy certificate list, and skip granting the third permission to a second application program; or add, according to the update information, the third permission corresponding to the third certificate in the trustworthy certificate list, and grant the third permission to a second application program, where the second application program is an application program that is signed using the third certificate.

Optionally, the receiving module 805 is configured to receive update information sent by the mobile terminal manufacturer, where the update information carries a third certificate and an operation instruction, and the operation instruction is used to add the third certificate to or delete the third certificate from the trustworthy certificate list; the updating module 806 is further configured to, according to the update information, add the third certificate to the trustworthy certificate list, or delete the third certificate from the trustworthy certificate list; and the processing module 807 is further configured to, after the updating module adds the third certificate to the trustworthy certificate list, grant a permission corresponding to the third certificate to a second application program; or after the updating module deletes the third certificate from the trustworthy certificate list, skip granting a permission corresponding to the third certificate to a second application program, where the second application program is an application program that is signed using the third certificate.

Therefore, if the first permission is not opened, the first permission that the first application program requires when being installed or running is granted to the first application program, thereby ensuring that the system is secure and stable.

Figure 10:
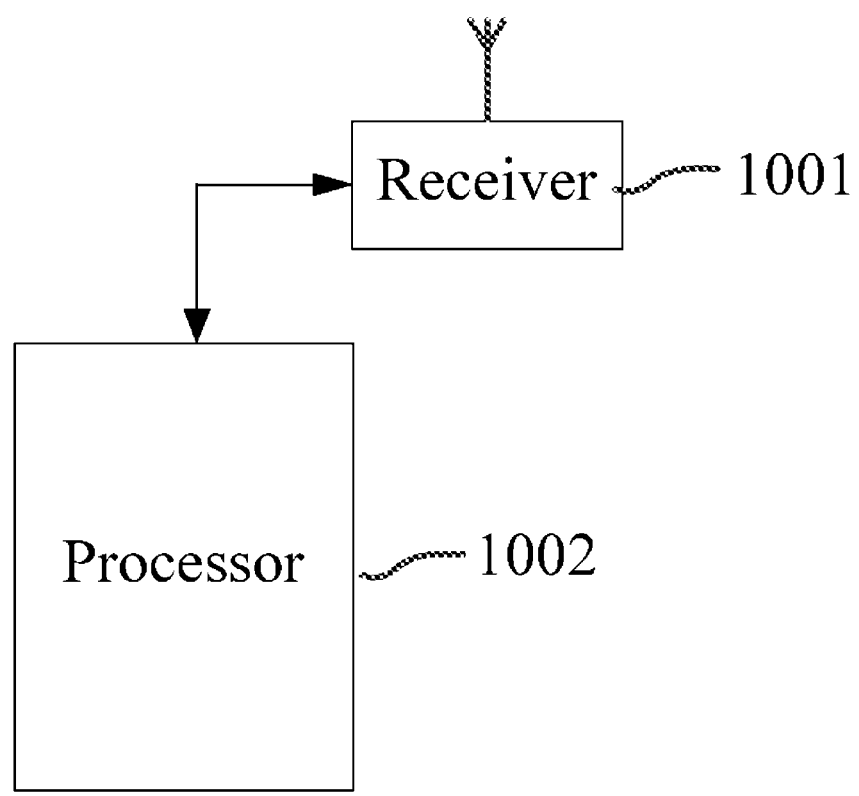
FIG. 10 is a schematic structural diagram of an embodiment of a terminal according to the present invention.

FIG. 10 is a schematic structural diagram of an embodiment of a terminal according to the present invention. As shown in FIG. 10, the terminal includes a receiver 1001, and a processor 1002 connected to the receiver 1001, where the receiver 1001 is configured to obtain an installation package of a first application program, where the installation package carries a first certificate and permission request information of the first application program; and the processor 1002 is configured to determine, according to the permission request information, a first permission that the first application program requires when being installed or running, where the first permission is a system administrator permission of a system; and grant the first permission to the first application program according to the first certificate of the first application program, where the first certificate is a certificate for signing the first application program.

In this embodiment, the installation package of the first application program is obtained, where the installation package carries the first certificate and the permission request information of the first application program; the first permission that the first application program requires when being installed or running is determined according to the permission request information, where the first permission is a system resource or function access permission that the first application program is incapable of obtaining, and the first application program is an application program that is developed by an application developer except a system developer and a mobile terminal manufacturer; and the first permission is granted to the first application program according to the first certificate of the first application program. The first permission that the first application program requires when being installed or running is granted to the first application program; and in this way, control of or access to a system of a mobile terminal by a user can be implemented.

In this embodiment, the processor 1002 is configured to determine whether a second certificate is stored in a trustworthy certificate list, where the second certificate is a certificate that is found in the trustworthy certificate list using index information in the first certificate, at least a certificate that allows to be granted to an application program is stored in the trustworthy certificate list, and the mobile terminal manufacturer configures the trustworthy certificate list; and if it is determined that the second certificate is stored in the trustworthy certificate list, grant the first permission to the first application program; or if it is determined that the second certificate is not stored in the trustworthy certificate list, grant a second permission to the first application program, or prompt a user to save the second certificate in a user trustworthy certificate list, and after the user saves the second certificate in the user trustworthy certificate list, grant the first permission to the first application program, where a certificate trusted by the user is stored in the user trustworthy certificate list, and the second permission is a permission that is opened to the first application program by the system developer and the mobile terminal manufacturer.

Based on the foregoing embodiments, the processor 1002 is further configured to determine whether permission information corresponding to the second certificate in the trustworthy certificate list includes the first permission; and if it is determined that the permission information corresponding to the second certificate in the trustworthy certificate list includes the first permission, grant the first permission to the first application program; or if it is determined that the permission information corresponding to the second certificate in the trustworthy certificate list does not include the first permission, grant the second permission to the first application program.

Optionally, in this embodiment, the processor 1002 is further configured to determine whether a second certificate is stored in the trustworthy certificate list, where the second certificate is a certificate that is found using index information in an upper-level certificate of the first certificate; and if it is determined that the second certificate is stored in the trustworthy certificate list, grant the first permission to the first application program; or if it is determined that the second certificate is not stored in the trustworthy certificate list, grant the second permission to the first application program.

Based on the foregoing embodiments, the processor 1002 is further configured to determine, according to the second certificate and signature information in the first application program, whether the installation package of the first application program is complete; and if it is determined that the installation package of the first application program is not complete, terminate all operations; or if it is determined that the installation package of the first application program is complete, grant the first permission to the first application program.

Further, based on the foregoing embodiments, the processor 1002 is configured to perform hash calculation on the first application program using first certificate information of the first application program, to obtain a first hash value; and perform hash calculation on the first application program using public key decryption recorded in the second certificate, to obtain a second hash value. If the first hash value is equal to the second hash value, the installation package is complete; or if the first hash value is not equal to the second hash value, the installation package is not complete.

Based on the foregoing embodiments, the trustworthy certificate list is placed in a mobile terminal or a server.

Based on the foregoing embodiments, the processor 1002 is further configured to set the first permission in the system.

The receiver 1001 is further configured to receive update information sent by the mobile terminal manufacturer, where the update information carries an index of a third certificate, a third permission configured in the third certificate, and an operation instruction, the operation instruction is used to indicate deletion or adding of the third permission corresponding to the third certificate, and the third certificate has been set in the trustworthy certificate list; and the processor 1002 is further configured to delete or add, according to the update information, the third permission corresponding to the third certificate in the trustworthy certificate list; or, the processor 1002 is further configured to delete, according to the update information, the third permission corresponding to the third certificate in the trustworthy certificate list, and skip granting the third permission to a second application program; or add, according to the update information, the third permission corresponding to the third certificate in the trustworthy certificate list, and grant the third permission to a second application program, where the second application program is an application program that is signed using the third certificate.

In addition, the receiver 1001 is further configured to receive update information sent by the mobile terminal manufacturer, where the update information carries a third certificate and an operation instruction, and the operation instruction is used to add the third certificate to or delete the third certificate from the trustworthy certificate list; and the processor 1002 is further configured to, according to the update information, add the third certificate to the trustworthy certificate list, or delete the third certificate from the trustworthy certificate list; or, the processor 1002 is further configured to, after the third certificate is added to the trustworthy certificate list, grant a permission corresponding to the third certificate to a second application program; or after the third certificate is deleted from the trustworthy certificate list, skip granting a permission corresponding to the third certificate to a second application program, where the second application program is an application program that is signed using the third certificate.

In this embodiment, the installation package of the first application program is obtained, where the installation package carries the first certificate and the permission request information of the first application program; the first permission that the first application program requires when being installed or running is determined according to the permission request information; and the first permission is granted to the first application program according to the first certificate of the first application program.

Persons of ordinary skill in the art may understand that all or a part of the steps of the method embodiments may be implemented by a program instructing relevant hardware. The program may be stored in a computer readable storage medium. When the program runs, the steps of the method embodiments are executed. The foregoing storage medium includes any medium that can store program code, such as a ROM, a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause corresponding technical solutions to depart from the scope of the technical solutions of the embodiments of the present invention.

What is claimed is:

1. An application program installation method comprising:
   certifying, by a terminal, an installation package received by the terminal using a first certificate, wherein the installation package comprises the first certificate for a first application program and a request for a first permission of the first application program, wherein the first certificate comprises an index, and wherein the first application program requires the first permission when running in the terminal;
   determining, by the terminal, whether a second certificate is stored in a trustworthy certificate list according to the index when the installation package has been certified, wherein the trustworthy certificate list is pre-configured, and wherein the first permission is granted to the first application program when the second certificate is stored in the trustworthy certificate list according to the index;
   recording, by the terminal, installation information of the first application program, wherein the installation information indicates whether the first permission is granted to the first application program; and
   installing, by the terminal, the first application program to be executed based on the installation information.

2. The method according to claim 1, wherein the installation information indicates that a second permission is granted to the first application program when the second certificate is not stored in the trustworthy certificate list, wherein the first permission is a system administrator permission of a system in the terminal, and wherein the second permission is a permission that is opened to the first application program by a system developer and a manufacturer of the terminal.

3. The method according to claim 2, further comprising terminating all operations when the installation package of the first application program is not complete.

4. The method according to claim 1, wherein certifying the installation package using the first certificate comprises determining by the terminal and according to the first certificate and signature information in the first application program, whether the installation package of the first application program is complete.

5. The method according to claim 1, further comprising:
prompting, by the terminal, a user to add the second certificate into a user trustworthy certificate list when the terminal determines that the second certificate is not stored in the trustworthy certificate list and before recording the installation information; and
recording, by the terminal, the installation information after the second certificate is added in the user trustworthy certificate list, wherein a certificate trusted by the user s stored in the user trustworthy certificate list.

6. The method according to claim 1, wherein the index is an index of an upper-level certificate of the first certificate, and wherein the second certificate is the same as the upper-level certificate of the first certificate.

7. The method according to claim 1, further comprising:
receiving, by the terminal, update information, wherein the update information carries a third certificate and an operation instruction, and wherein the operation instruction is used to add the third certificate to or delete the third certificate from the trustworthy certificate list;
granting, by the terminal, a permission corresponding to the third certificate to a second application program when the third certificate is added to the trustworthy certificate list according to the update information, wherein the second application program is an application program that is signed using the third certificate; and
skipping granting the permission corresponding to the third certificate to the second application program when the third certificate is deleted from the trustworthy certificate list according to the update information.

8. The method according to claim 1, wherein the index is an index of the first certificate, and wherein the second certificate is the same as the first certificate.

9. A terminal comprising:
a receiver configured to receive an installation package comprising a first certificate for a first application program and a request for a first permission of the first application program, wherein the first certificate comprises an index, and wherein the first application program requires the first permission when running in the terminal; and
a processor coupled to the receiver and configured to:
certify the installation package using the first certificate in response to receiving the installation package;
determine whether a second certificate is stored in a trustworthy certificate list according to the index when the installation package has been certified, wherein the trustworthy certificate list is pre-configured, and wherein the first permission is granted to the first application program when the second certificate is stored in the trustworthy certificate list according to the index;
record installation information of the first application program, wherein the installation information indicates whether the first permission is granted to the first application program; and
install the first application program to be executed based on the installation information.

10. The terminal according to claim 9, wherein the installation information indicates that a second permission is granted to the first application program when the second certificate is not stored in the trustworthy certificate list, wherein the first permission is a system administrator permission of a system in the terminal, and wherein the second permission is a permission that is opened to the first application program by a system developer and a manufacturer of the terminal.

11. The terminal according to claim 9, wherein the processor is further configured to:
determine, according to the first certificate and signature information in the first application program, whether the installation package of the first application program is complete;
terminate all operations when the installation package of the first application program is not complete; and
determine whether the second certificate is stored in the trustworthy certificate list when the installation package of the first application program is complete.

12. The terminal according to claim 9, wherein the processor is further configured to:
prompt, before the processor records the installation information, a user to add the second certificate into a user trustworthy certificate list when the processor determines that the second certificate is not stored in the trustworthy certificate list; and
record the installation information after the second certificate is added in the user trustworthy certificate list, wherein a certificate trusted by the user stored in the user trustworthy certificate list.

13. The terminal according to claim 9, wherein the index is an index of an upper-level certificate of the first certificate, and wherein the second certificate is the same as the upper-level certificate of the first certificate.

14. The terminal according to claim 9, wherein the receiver is further configured to receive update information after the processor installs the first application program, wherein the update information carries a third certificate and an operation instruction, wherein the operation instruction is used to add the third certificate to or delete the third certificate from the trustworthy certificate list, and wherein the processor is further configured to:
add the third certificate to the trustworthy certificate list according to the update information; and
grant a permission corresponding to the third certificate to a second application program after the third certificate is added to the trustworthy certificate list, wherein the second application program is an application program that is signed using the third certificate.

15. The terminal according to claim 9, wherein the receiver is further configured to receive update information after the processor installs the first application program, wherein the update information carries a third certificate and an operation instruction, wherein the operation instruction indicates whether to add the third certificate to or delete the third certificate from the trustworthy certificate list, and wherein the processor is further configured to:
delete the third certificate from the trustworthy certificate list according to the update information; and
skip granting a permission corresponding to the third certificate to a second application program after the third certificate is deleted from the trustworthy certificate list, wherein the second application program is an application program that is signed using the third certificate.

16. The terminal according to claim 9, wherein the index is an index of the first certificate, and wherein the second certificate is the same as the first certificate.

* * * * *